US009251248B2

(12) United States Patent
Agrawal

(10) Patent No.: US 9,251,248 B2
(45) Date of Patent: Feb. 2, 2016

(54) USING CONTEXT TO EXTRACT ENTITIES FROM A DOCUMENT COLLECTION

(75) Inventor: Sanjay Agrawal, Sammamish, WA (US)

(73) Assignee: Microsoft Licensing Technology, LLC, Redmond, WA (US)

( * ) Notice: Subject to any disclaimer, the term of this patent is extended or adjusted under 35 U.S.C. 154(b) by 970 days.

(21) Appl. No.: 12/794,779

(22) Filed: Jun. 7, 2010

(65) Prior Publication Data

US 2011/0302179 A1    Dec. 8, 2011

(51) Int. Cl.
*G06F 17/30* (2006.01)

(52) U.S. Cl.
CPC ................... *G06F 17/30616* (2013.01)

(58) Field of Classification Search
CPC .................................. G06F 17/30616
USPC .......................................... 707/737
See application file for complete search history.

(56) References Cited

U.S. PATENT DOCUMENTS

| 6,295,543 | B1* | 9/2001 | Block et al. ................. 715/234 |
| 7,603,393 | B1* | 10/2009 | Cote et al. |
| 7,672,833 | B2 | 3/2010 | Blume et al. |
| 7,685,201 | B2 | 3/2010 | Zeng et al. |
| 7,895,205 | B2* | 2/2011 | Qin et al. ....................... 707/736 |
| 7,987,188 | B2* | 7/2011 | Neylon et al. ................. 707/739 |
| 8,041,126 | B1* | 10/2011 | Naik et al. ..................... 382/229 |
| 8,041,669 | B2* | 10/2011 | Nigam et al. ................... 706/55 |
| 2001/0032204 | A1* | 10/2001 | Hoashi et al. ..................... 707/5 |
| 2005/0071365 | A1* | 3/2005 | Hou et al. ...................... 707/102 |
| 2005/0086205 | A1* | 4/2005 | Franciosa et al. ................ 707/3 |
| 2007/0027672 | A1 | 2/2007 | Decary et al. |
| 2008/0065621 | A1 | 3/2008 | Ellis |
| 2008/0172364 | A1 | 7/2008 | Cucerzan et al. |
| 2008/0195567 | A1* | 8/2008 | Chen et al. ....................... 706/46 |
| 2009/0125371 | A1* | 5/2009 | Neylon et al. ................... 705/10 |
| 2009/0282012 | A1 | 11/2009 | Konig et al. |
| 2009/0319500 | A1 | 12/2009 | Agrawal et al. |
| 2012/0136812 | A1* | 5/2012 | Brdiczka ........................ 706/12 |

OTHER PUBLICATIONS

Banko, et al., "Open Information Extraction from the Web", Retrieved at <<http://ijcai.org/papers07/Papers/IJCAI07-429.pdf>>, In IJCAI, 2007, pp. 2670-2676.

(Continued)

*Primary Examiner* — James Trujillo
*Assistant Examiner* — Kurt Mueller
(74) *Attorney, Agent, or Firm* — Alin Corie; Kate Drakos; Micky Minhas

(57) ABSTRACT

Described is using context information obtained from entity mentions in likely relevant documents to extract entity mentions from documents that are ambiguous with respect to their relevance to a domain. A list of entities is input into an entity extraction mechanism, which processes a large collection of documents to determine data (counts) corresponding to frequency of entity mentions. Infrequently mentioned entities are specific entities, while frequently mentioned entities are non-specific (generic or ambiguous) entities. The context surrounding mentions of the specific entities is processed to obtain interesting context terms (words, phrases or both) for the domain. The interesting context terms are then compared against the contexts of non-specific entity mentions to determine whether each non-specific entity mention is relevant to the domain. A result set containing only relevant documents or relevant mentions collection is output.

20 Claims, 5 Drawing Sheets

(56) References Cited

OTHER PUBLICATIONS

Agichtein, et al., "Predicting Accuracy of Extracting Information from Unstructured Text Collections", Retrieved at <<http://research.microsoft.com/users/silviu/Papers/cikm05.pdf>>, Conference on Information and Knowledge Management, Proceedings of the 14th ACM international conference on Information and knowledge management, Oct. 31-Nov. 5, 2005, pp. 8.

Ganti, et al., "Entity Categorization Over Large Document Collections", Retrieved at <<http://www.ics.uci.edu/~rares/pub/kdd08-p274-ganti.pdf>>, International Conference on Knowledge Discovery and Data Mining, Proceeding of the 14th ACM SIGKDD international conference on Knowledge discovery and data mining, Aug. 24-27, 2008, pp. 274-282.

Cucerzan, Silviu., "Large-Scale Named Entity Disambiguation Based on Wikipedia Data", Retrieved at <<http://acl.ldc.upenn.edu/D/D07/D07-1074.pdf>>, EMNLP 2007, Empirical Methods in Natural Language Processing, Jun. 28-30, 2007, pp. 708-716.

Agichtein, et al., "Snowball: Extracting Relations from Large Plain-Text Collections", Retrieved at <<http://www.cl.uni-heidelberg.de/~sourjiko/NER_Literatur/Agichtein_Snowball.pdf>>, In Proceedings of the 5th ACM International Conference on Digital Libraries, 2000, pp. 10.

\* cited by examiner

USING CONTEXT TO EXTRACT ENTITIES FROM A DOCUMENT COLLECTION

BACKGROUND

Given a large collection of documents, there are various applications that benefit from having a relatively small subset of these documents filtered and identified in an appropriate way, or to extract certain entity information (e.g., words or phrases) from only relevant documents, or both. By way of example, consider that the collection to be processed comprises the large number of documents on the web, on the order of billions. An example entity extraction task may be to identify mentions of book titles within the web pages, given a prepared list of the desired book titles.

The task of extracting entities is difficult when some of the entities in the provided list have a significant overlap with entities in other domains or with the underlying language of the documents or both. For example, consider the movie "seven" (ignoring uppercase versus lowercase) among a list of movie titles to extract. There are many documents that contain the term "seven" that have nothing to do with the movie, e.g., there are seven days in a week, the distance to a location is seven miles, and so on. This overlap makes it very difficult to disambiguate relevant ("true") mentions of such entities with respect to the domain from irrelevant ("false") mentions.

Further, there is generally very limited domain-based information in terms of available training data, or in terms of available classifiers for entity extraction tasks or both. In general this is because there is a significant variety of such entity lists for which extraction is desired, and differing entity domains over which extraction may be performed, each domain having to have a classifier trained with knowledge of the specific domain. Indeed, such data may be entirely absent for an entity list or domain. By way of example, there may not be a classifier available for an entity list comprising romantic movies. Even if one exists, running such a classifier over such a large document collection may not be practical as a classifier tends to have large amount of performance overhead.

Another difficulty arises from the large size of the underlying document collection, which limits the time that can be spent on each document for extraction purposes. The large size of the document collection makes it impractical to identify all mentions of entities over the entire document collection as an intermediate step, followed by a subsequent step that removes false mentions. This is even worse in the presence of entities that overlap with the underlying language of the document, e.g., materializing mentions of "man" over web pages can lead to millions of web page URLs in which only a small fraction of the pages refer to a movie named "man."

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards an entity extraction technology by which a large set of documents is filtered into a smaller subset of documents that contain mentions of identified entities that are likely relevant to a domain corresponding to the entities. In one aspect, a list of entities is input into an entity extraction mechanism. The entity extraction mechanism processes the collection of documents to determine data corresponding to how frequently each entity of a list of entities corresponding to a domain is mentioned in the collection. For example, for each entity, a percentage of how many documents the entity is mentioned in relative to the total number of documents may be used as a measure of the entity frequency. Entities that are mentioned infrequently are identified as specific entities, while entities that are mentioned frequently are identified as non-specific (e.g., generic or ambiguous) entities.

For the set of specific entities, context relative to the mentions of the entities is extracted from the documents, e.g., some number of words or phrases (or a mix of words and phrases) before and after the entity mention. Based upon the context, interesting context terms (note that each "term" comprises a word, or a phrase comprising multiple words, for example) for the domain are selected. For example, terms in the contexts become candidate terms, with those candidate terms processed based upon count information to eliminate candidates that are too frequent among the collection (and thus may not have affinity with the domain or correlation with entity mentions for the domain), or to eliminate candidate terms that are as likely to be mentioned within the context of a specific entity as mentioned outside the context.

Once the interesting context terms for the domain are known, the documents are processed to determine whether non-specific entity mentions in those documents are likely relevant to the domain. To this end, the context surrounding each non-specific entity mention is evaluated against the interesting context terms. If there is a match in the non-specific entity mention's context with one (or more) of the context terms, then the non-specific entity mention and document are considered relevant to that domain; other documents are filtered out. A result set containing only relevant documents or relevant mentions or both corresponding to a filtered subset of the collection is output.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a mechanism that uses context around mentions of entities in a large document collection to perform entity extraction in a generally automated manner. As will be understood, the technology performs the entity extraction without necessarily needing any knowledge of the underlying entity domain for the extraction task.

While entity extraction from documents is one usage scenario for the technology, the mechanism can be used for a variety of other tasks. For example, as will be understood, the mechanism may be used as a very fast and automated filtering mechanism to significantly reduce the amount of data (e.g., by orders of magnitude, approximately fifty times in one implementation) for further processing without requiring knowledge of underlying entity domains. In this way, for example, the mechanism may be used as a pre-filter that provides remaining documents to one or more subsequent extractors, such as an extractor having advanced domain-dependent knowledge to further improve the accuracy of extraction.

The technology described herein may be used to generate training data, e.g., by providing the output (document-to-entity mentions) to humans, such as to collect good quality training data for further supervised learning techniques for a given entity domain. The technology may be used to generate rules, e.g., an entity mention is a likely true mention if it contains context terms.

As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and data processing in general.

Figure 1:
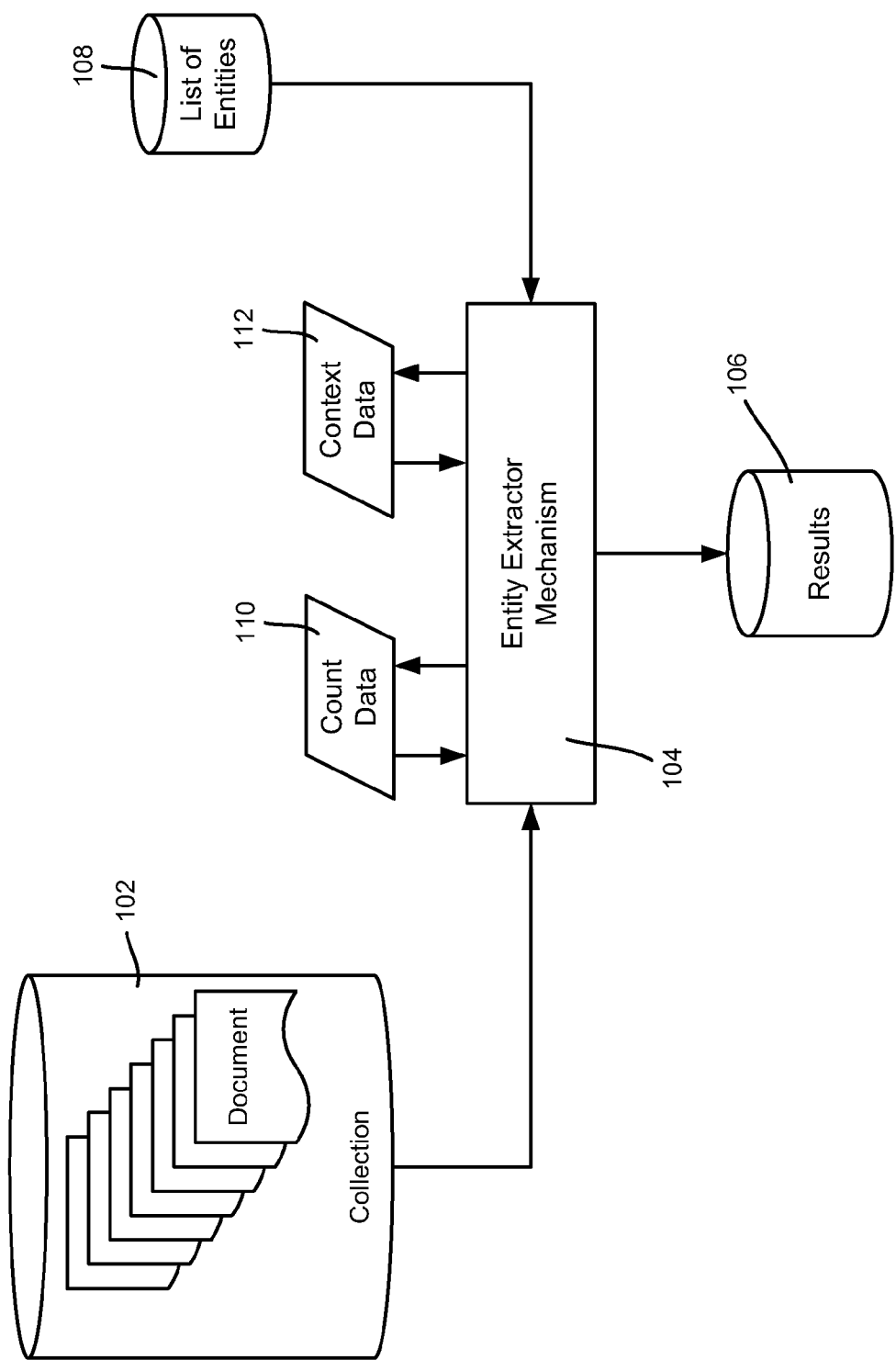
FIG. 1 is block diagram representing an entity extraction mechanism that uses context to filter a large document collection based upon entity names for a domain.

FIG. 1 is a block diagram showing a document collection 102 being processed in an automated way by an entity extraction mechanism 104 to provide results 106 corresponding to a provided set (list) of extracted entities 108. The number of documents in the collection 102 is typically very large, e.g., at a web scale The results 106 may comprise a list of entity mentions for each document, entity mention pair over the document collection, but may be in any other suitable format, e.g., a list of document identifiers for the documents that contain the entity names, text snippets in which the entity names appear, and so forth.

For example, a document identifier, entity name, and location (or multiple locations of that entity name) within the document may be maintained as the results, e.g., <docID, "Seven", 100>. Instances of common documents (the same document) may be merged in the results, e.g., a document that contains two different entity names that are true with respect to the domain (and thus has two instances) may be referenced as <docID, <"Seven", 100>, <"ABC goes to DEFG" 150>> and so on (where "ABC goes to DEFG" is a hypothetical movie title); note that a pointer/identifier to the entity name in the list, rather than the entity name itself, may be maintained in the data.

In one implementation, the entity extraction mechanism 104 uses various count data 110 obtained from the documents as described below. As also described below, the entity extraction mechanism 104 uses context data 112, namely text surrounding the entity names in the documents, to determine whether mentions of entity names are true or false with respect to being relevant to the entity.

As can be readily appreciated, the use of appropriate context terms significantly reduces the number of false mentions of entities within documents. The mechanism 104 uses mathematical representations related to frequency distribution, such as counting of entity mentions or context terms over the documents, (which is very efficient and can be performed in parallel; for example a large document collection, map reduce architecture may be used).

Figure 2:
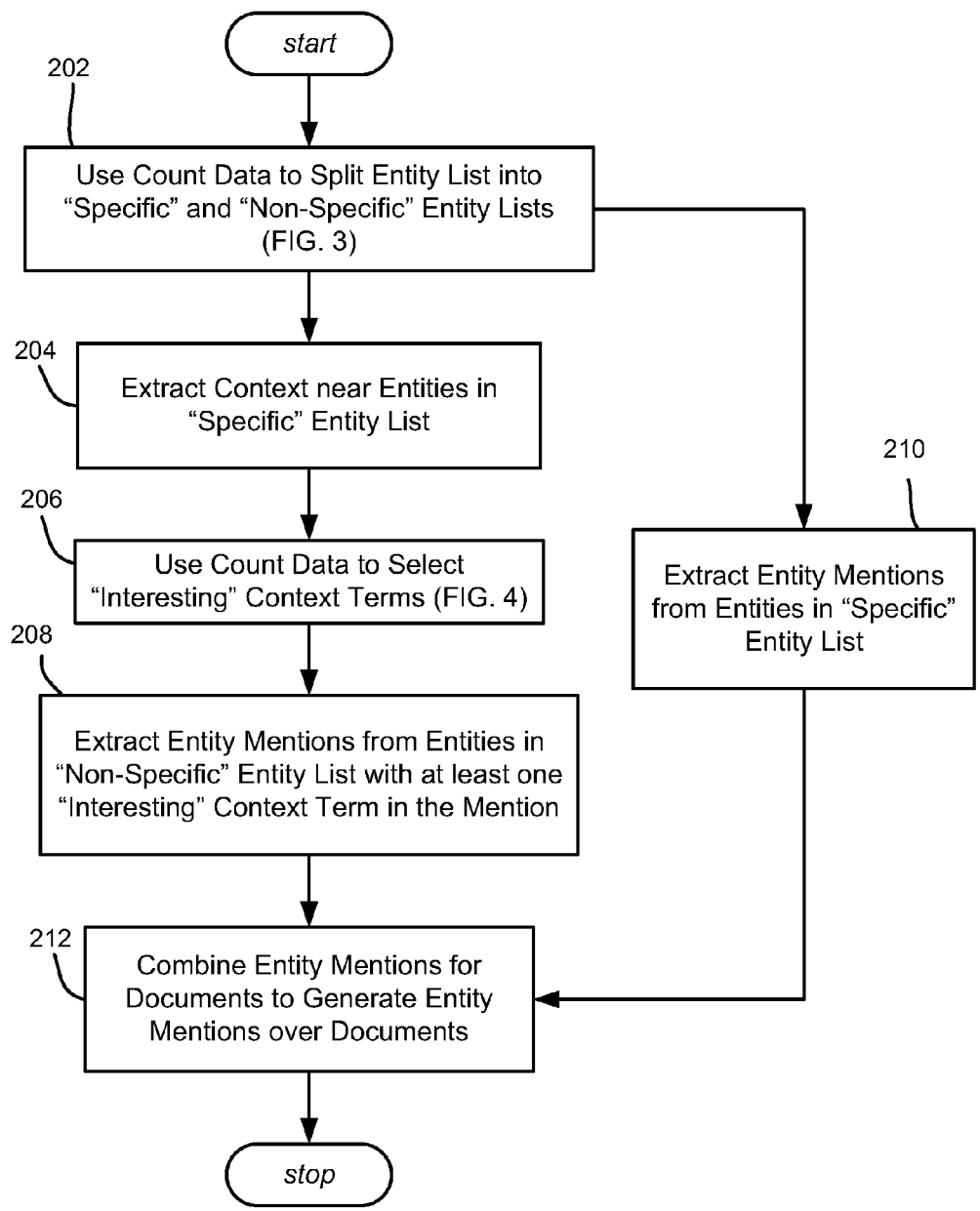
FIG. 2 is a flow diagram representing example steps that may be taken by the entity extraction mechanism to filter the document collection.
Figure 3:
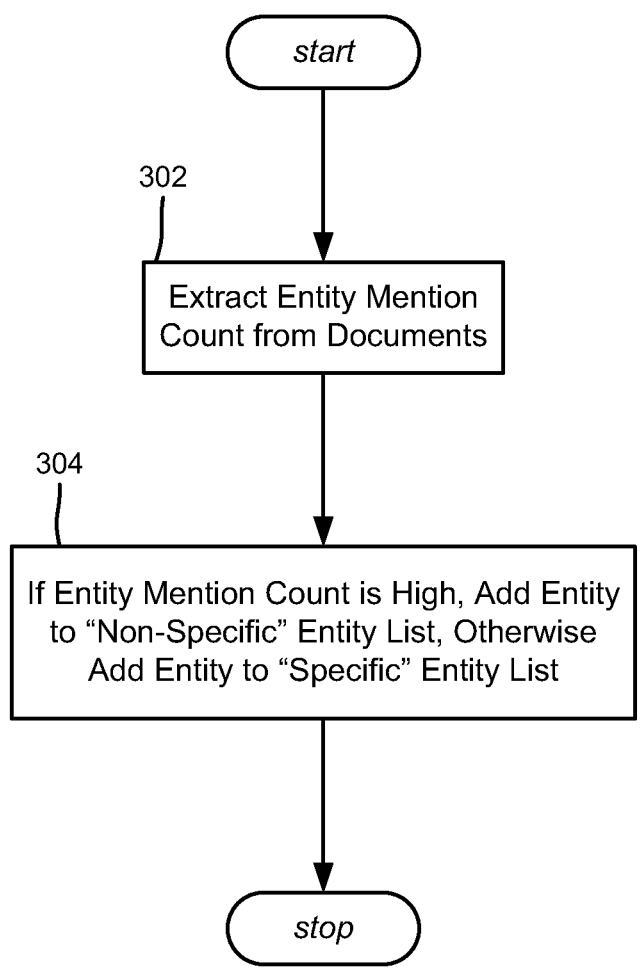
FIG. 3 is a flow diagram representing example steps that may be taken by the entity extraction mechanism to separate entities into specific or non-specific (ambiguous) categories based on counts of the times the entities are mentioned in the document collection.

FIG. 2 shows general logic of the entity extraction mechanism 104, beginning at step 202 where the mechanism 104 splits the entity list based on entity counts. More particularly, as generally represented in FIG. 3, step 302 extracts an entity mention count from the documents for each entity. The count may be the number of documents in which the entity is mentioned, may be the total number of instances (if mentioned twice in the same document add two to the count) or some combination thereof (e.g., count the instances but not more than three maximum per document).

If the entity mention count for a given entity is high, such as above some threshold percentage (e.g., one-tenth of a percent) of the total number of documents, then that entity is considered as ambiguous and added to a non-specific list. If the entity mention count for a given entity is low, then that entity is not as likely to be ambiguous and is added to a specific entity list. Using the above example, "Seven" is mentioned in a large number of documents, and thus ambiguous as to whether it is referring to the movie or to another concept, whereas a movie title having a long or unusual name will be mentioned far less frequently, and thus when the entity is mentioned, the document is more likely to be referring to that specific movie.

Returning to FIG. 2, at step 204 the collection is processed based upon the entities named in the specific list to extract the context surrounding the named entities. The general idea is that if an entity is likely to be the true entity (e.g., an actual movie title) in a given document, the terms (words or phrases) around that entity may be related to the concept (e.g., movies) to which that entity relates. Because the specific list contains the entities that are likely true, their contexts provide useful information. The context may be some number of terms (e.g., five, ten, twenty) before and after the entity; note that the "before" number need not be the same as the "after" number.

Not all of the context terms may be "interesting" terms with respect to the domain (e.g., movies, medicines, musicians, consumer electronics, people and so forth), in that they do not help distinguish entity mentions that are true with respect to the domain from those that are false. For example, frequently used terms such as "the" and "was" and "this is" do not provide much (if any) insight into whether an unknown entity mention is true or false in a document. However, if the entity list is names of musicians, for example, a term such as "guitar" is relevant to (has affinity with) the domain and is more likely an "interesting" term, such as determined in the manner described above. Note that stopword filtering may be applied to reduce the number of affinity counts that need to be determined, e.g., words such as "and" and "the" (and phrases such as "this is") can be eliminated without obtaining their affinity counts in order to eliminate them.

Figure 4:
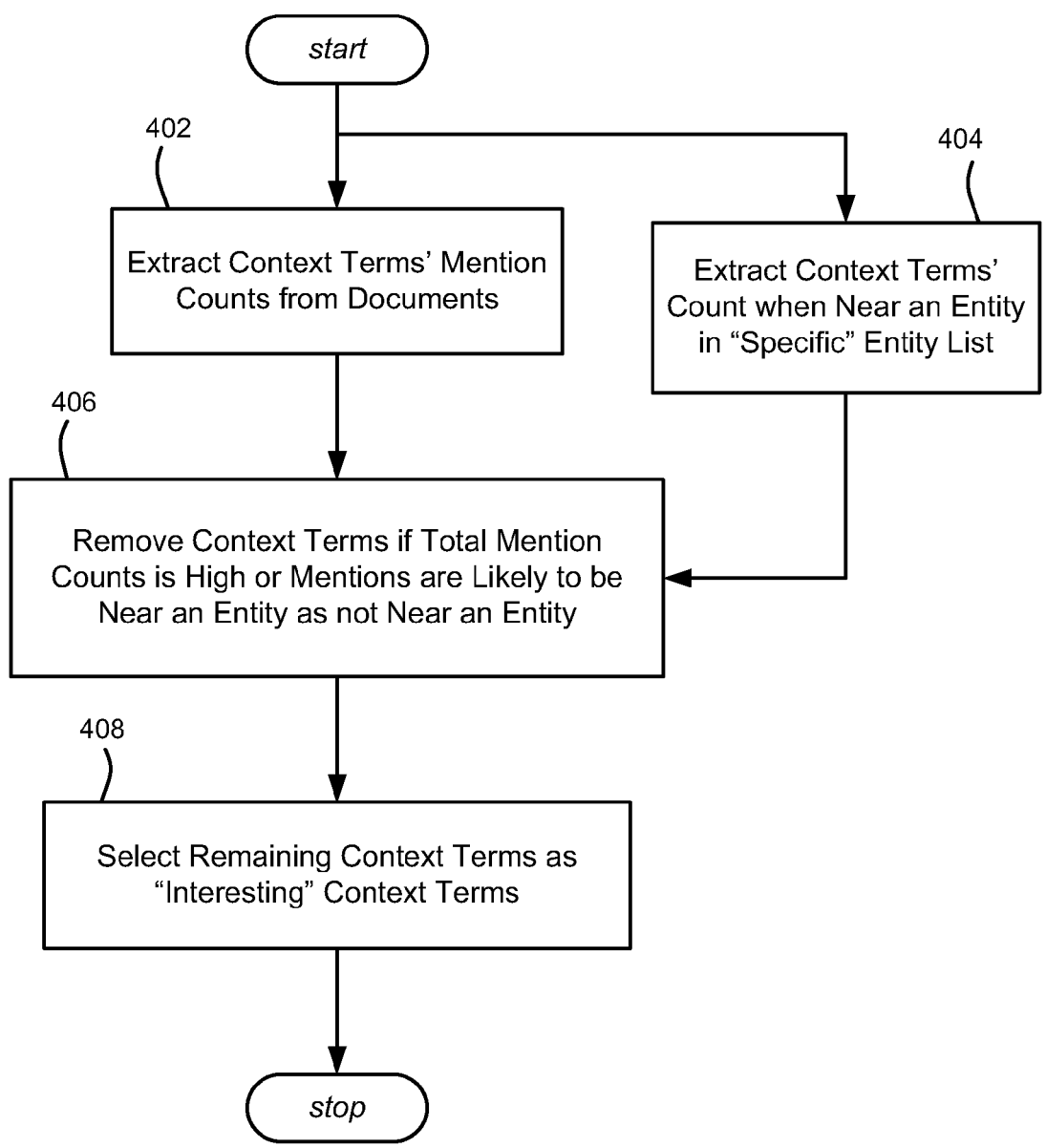
FIG. 4 is a flow diagram representing example steps that may be taken by the entity extraction mechanism to determine a set of interesting context terms for a domain from the context of entity mentions.

In order to determine whether a context term is considered interesting, affinity count data is referenced at step 206, as more particularly represented in FIG. 4. In one implementation, the mention counts of the context terms are obtained at step 402 as the affinity counts. At step 404, the mention counts of the context terms that are near an entity are also obtained. At step 406, the counts are used to remove candidate context terms that are used too frequently, or if their mentions are as likely to be near an entity as not near an entity and thus do not correlate with entity mentions for the domain; (note that, exactly likely is not required to be considered "as likely"). The remaining context terms are those considered as the "interesting" context terms with respect to having affinity with the true entity mentions.

To summarize, context terms (words or phrases) that occur near the mention of entities in the "specific" entity list are extracted as candidate context terms for entities in the non-specific entity list. Further mentions of the candidate context terms are counted over the document collection. In addition, for each candidate context term, the affinity counts over the document collection are generated where the candidate context terms is in the context of an entity in the "specific" entity list. Candidate context terms that occur in a large number of documents, or are as likely to be mentioned within the context of an entity in the "specific" entity list as they are likely to be mentioned outside the context of such entities, are removed from consideration. The remaining candidate context terms are the "interesting" context terms.

Step 208 of FIG. 2 represents filtering the documents based on whether at least one interesting context terms is in the context of a non-specific entity that is mentioned. This filtering restricts the true mentions of "non-specific" entities to ones where the mentions have at least one "interesting" context term in its context, that is, if there are no "interesting" context terms near the mention of the entity, the mention is considered as a false mention and is removed from consideration.

In this manner, an ambiguous entity such as "seven" mentioned in a document may be considered a true mention with respect to a movie title if the surrounding terms include an interesting context term such as "director" or "starred in" that were extracted as being interesting context terms from documents known to have specific entity mentions. Conversely, if there are no such interesting terms in the surrounding context of a "seven" mention, then this mention is considered not true and the document is filtered out. Note that the context need not be the same number of words or phrases as processed in the specific entity list, e.g., the context in the specific entity list from which interesting context terms were extracted may have been ten words on either side of the specific entity mention, while filtering non-specific entity documents may need to have an interesting context term within a five word context on either side of the non-specific entity mention, or vice-versa.

Note that the filter may be even more restrictive in an implementation by having to have two (or some other number of) interesting context terms within the context of the non-specific entity mention. The more restrictive filter may be applied to certain entities and not others. For example, if instead of having two (non-specific and specific) categories for entities, consider a split of the entities in the list into a specific category (e.g., low percentage of mentions per total documents) and a non-specific category comprising ambiguous (medium percentage) and very ambiguous (high percentage) categories. At least a single interesting context terms may be needed in an ambiguous entity mention's context to not filter out the document, with at least two interesting context terms needed for very ambiguous entity mentions. Alternatively, the list of interesting context terms may be larger for ambiguous entity mentions and smaller for very ambiguous entity mentions, such as by using different affinity counts for each category.

Information other than counts may be used to help in the filtering. For example, titles usually start with a capital letter, and thus if extracting titles, this information can be used as well.

The entities that are in the specific category are considered to be likely relevant with respect to the domain, whereby documents containing these specific entity mentions are not filtered out from the results. The documents are processed to extract the specific entity mentions, as represented by step 210.

Step 212 represents producing the results by combining the extracted specific mentions with the (formerly) non-specific entity mentions that remain after interesting context-based term filtering. These results may be used in any suitable way.

As can be seen, the mechanism is frequency or count-based, and is thus substantially non-specific and can be applied to entities in a variety of domains. The mechanism operates in a generally automated manner, without requiring knowledge of underlying entity domains for the extraction task.

Exemplary Operating Environment

Figure 5:
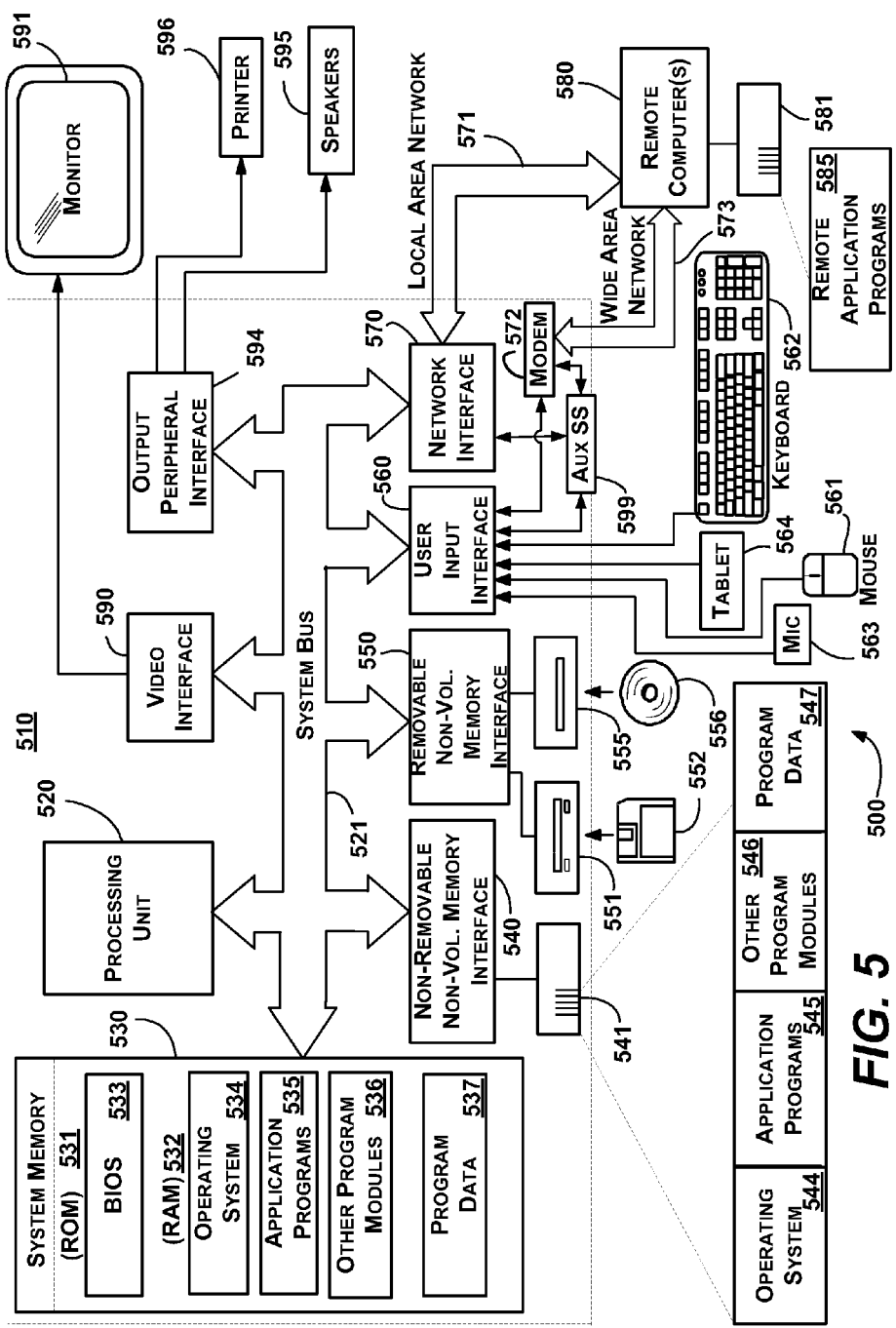
FIG. 5 shows an illustrative example of a computing environment into which various aspects of the present invention may be incorporated.

FIG. 5 illustrates an example of a suitable computing and networking environment 500 on which the examples of FIGS. 1-4 may be implemented. The computing system environment 500 is only one example of a suitable computing environment and is not intended to suggest any limitation as to the scope of use or functionality of the invention. Neither should the computing environment 500 be interpreted as having any dependency or requirement relating to any one or combination of components illustrated in the exemplary operating environment 500.

The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 5, an exemplary system for implementing various aspects of the invention may include a general purpose computing device in the form of a computer 510. Components of the computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 510 typically includes a variety of computer-readable media. Computer-readable media can be any available media that can be accessed by the computer 510 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 510. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536 and program data 537.

The computer 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media, described above and illustrated in FIG. 5, provide storage of computer-readable instructions, data structures, program modules and other data for the computer 510. In FIG. 5, for example, hard disk drive 541 is illustrated as storing operating system 544, application programs 545, other program modules 546 and program data 547. Note that these components can either be the same as or different from operating system 534, application programs 535, other program modules 536, and program data 537. Operating system 544, application programs 545, other program modules 546, and program data 547 are given different numbers herein to illustrate that, at a minimum, they are different copies. A user may enter commands and information into the computer 510 through input devices such as a tablet, or electronic digitizer, 564, a microphone 563, a keyboard 562 and pointing device 561, commonly referred to as mouse, trackball or touch pad. Other input devices not shown in FIG. 5 may include a joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. The monitor 591 may also be integrated with a touch-screen panel or the like. Note that the monitor and/or touch screen panel can be physically coupled to a housing in which the computing device 510 is incorporated, such as in a tablet-type personal computer. In addition, computers such as the computing device 510 may also include other peripheral output devices such as speakers 595 and printer 596, which may be connected through an output peripheral interface 594 or the like.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted in FIG. 5 include one or more local area networks (LAN) 571 and one or more wide area networks (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560 or other appropriate mechanism. A wireless networking component such as comprising an interface and antenna may be coupled through a suitable device such as an access point or peer computer to a WAN or LAN. In a networked environment, program modules depicted relative to the computer 510, or portions thereof, may be stored in the remote memory storage device. By way of example, and not limitation, FIG. 5 illustrates remote application programs 585 as residing on memory device 581. It may be appreciated that the network connections shown are exemplary and other means of establishing a communications link between the computers may be used.

An auxiliary subsystem 599 (e.g., for auxiliary display of content) may be connected via the user interface 560 to allow data such as program content, system status and event notifications to be provided to the user, even if the main portions of the computer system are in a low power state. The auxiliary subsystem 599 may be connected to the modem 572 and/or network interface 570 to allow communication between these systems while the main processing unit 520 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer-implemented method for analyzing electronic documents to determine contextual meanings of entities in the electronic documents and storing digital classifications of the documents based on the determined contextual meanings, the method comprising:
   inputting entity names from a list of entities corresponding to domains;
   processing a collection of documents to determine how frequently the entity names are mentioned in the collection of documents;
   classifying at least some of the entity names as specific entities based on being mentioned in the collection of documents less than a threshold number of times;
   determining interesting context terms in the documents based on the interesting context terms being positioned in the documents within a particular word proximity to the specific entities;
   classifying at least some of the specific entities as being related to the domains based on the interesting context terms being positioned in the documents within the particular word proximity to the specific entities; and
   storing an association of the at least some of the specific entities being related to the domains.

2. The method of claim 1 further comprising classifying at least some of the specific entities as non-specific entities based on being mentioned in the collection of documents more than a threshold number of times.

3. The method of claim 2 further comprising:
   outputting results corresponding to a first set of documents that include a mention of a specific entity; and
   outputting a second set of documents that each includes a mention of a non-specific entity and has one or more of the interesting context terms within the context of the non-specific entity.

4. The method of claim 3 further comprising merging a plurality of instances of a common document into a single representation of that common document in the results.

5. The method of claim 2, wherein classifying at least some of the entity names as specific entities based on being mentioned in the collection of documents less than a threshold number of times further comprises comparing a percentage of the documents that contain the at least one of the specific entities with respect to a total number of documents against a threshold percentage and classifying entities below the threshold percentage into a category corresponding to the non-specific entities.

6. The method of claim 1 wherein determining the interesting context terms comprises determining candidate context terms obtained from contexts of the mentions of the specific entities, and using count information of the candidate context terms over the document collection to eliminate candidate context terms that appear frequently in the document collection.

7. The method of claim 1 wherein determining the interesting context terms comprises determining candidate context terms obtained from contexts of the mentions of the specific entities, and using count information to eliminate candidate context terms for being as likely to be mentioned within the context of a specific entity as mentioned outside the context.

8. The method of claim 1 wherein determining the interesting context terms comprises determining candidate context terms obtained from contexts of the mentions of the specific entities and using count information of the candidate context terms over the document collection to eliminate candidate context terms that appear frequently in the document collection.

9. In a computing environment, a system comprising:
   at least one processor,
   a memory communicatively coupled to the at least one processor and including components comprising:
      an entity extraction mechanism configured to analyze electronic documents to determine contextual meanings of entities in the electronic documents and store digital classifications of the documents based on the determined contextual meanings, the entity extraction mechanism configured to:
         process a collection of documents to determine how frequently entity names are mentioned in a collection of documents,
         classify at least some of the entity names as specific entities based on being mentioned in the collection of documents less than a threshold number of times,
         determine interesting context terms in the documents based on the interesting context terms being positioned in the documents within a particular word proximity to the specific entities,
         classify at least some of the specific entities as being related to the domains based on the interesting context terms being positioned in the documents within the particular word proximity to the specific entities, and
         store an association of the at least some of the specific entities being related to the domains.

10. The system of claim 9 wherein the entity extraction mechanism outputs results comprising data corresponding to documents that contain one or more mentions of specific entities and documents that contain one or more mentions of the non-specific entities that are determined to be relevant to the domain.

11. The system of claim 10 wherein the results include a document identifier, data corresponding to the entity mention or mentions in that document, and data corresponding to a location of each entity mention in that document.

12. The system of claim 9 wherein the entity extraction mechanism determines how frequently each entity is mentioned in the collection of documents by counts of mentions for the entities.

13. The system of claim 9 wherein the entity extraction mechanism determines the interesting context terms by determining candidate context terms, and using count information of the candidate context terms over the document collection to eliminate candidate context terms that appear frequently in the document collection.

14. The system of claim 9 wherein the entity extraction mechanism determines the interesting context terms by determining candidate context terms, and using count information to eliminate candidate context terms that are as likely to be mentioned within the context of a specific entity as mentioned outside the context.

15. The system of claim 9 wherein the entity extraction mechanism determines the interesting context terms by eliminate candidate context terms based upon a set of stopwords.

16. The system of claim 9 wherein the domain corresponds to a movie domain, a medicine domain, a music-related domain, a consumer products domain, or a people domain.

17. The system of claim 9 wherein the collection comprises web documents.

18. One or more computer-readable storage media having computer-executable instructions, which when executed perform steps, comprising:

processing a collection of documents to determine data corresponding to how frequently entity names are mentioned in a collection of documents;

classifying at least some of the entity names as specific entities based on being mentioned in the collection of documents less than a threshold number of times;

determining interesting context terms in the documents based on the interesting context terms being positioned in the documents within a particular word proximity to the specific entities;

classifying at least some of the specific entities as being related to the domains based on the interesting context terms being positioned in the documents within the particular word proximity to the specific entities; and storing an association of the at least some of the specific entities being related to the domains.

19. The one or more computer-readable storage media of claim 18 further comprising extracting interesting context terms for the domain through obtaining count information of candidate context terms over the document collection to eliminate candidate context terms that appear frequently in the document collection.

20. The one or more computer-readable storage media of claim 18 further comprising extracting interesting context terms for the domain through using count information to eliminate candidate context terms that are as likely to be mentioned within the context of a specific entity as mentioned outside the context.

* * * * *